Patented Mar. 22, 1932

1,850,166

UNITED STATES PATENT OFFICE

THOMAS P. BELL, OF YONKERS, NEW YORK, ASSIGNOR TO THERMOPHOR MANUFACTURING COMPANY, INCORPORATED, OF NEW YORK, N. Y., A CORPORATION OF DELAWARE

THERMOPHORIC MIXTURE AND PROCESS OF MAKING THE SAME

No Drawing.   Application filed July 2, 1930.   Serial No. 495,457.

This invention relates to an improvement in thermophoric mixtures or heat storing compounds and process of making the same, such mixtures possessing the ability of absorbing heat while being reduced from a crystalline to a liquid condition and giving further heat when returning from a liquid to a crystalline condition.

Mixtures of this character are employed in various warming devices, such as rubber bags, food warmers, plates, dishes and coffee pots, foot warmers and the like. The mixture or compound is placed within the rubber bag or within a compartment in the plate, dish or other receptacle to be warmed, and the same is placed in boiling water for a few minutes until the mixture liquefies. The mixture will remain warm for several hours thereafter until it recrystallizes.

Prior to this invention, considerable difficulty has been encountered in using mixtures of crystalline salts for, in the compounding, they tend to form a sticky gummy mass difficult to insert in the containers and unstable under operating conditions.

An object of this invention is to provide a thermophoric mixture in which the heat of recrystallization can be varied at will by varying the percentage of certain of the ingredients.

Another object is to provide a thermophoric mixture which can be readily distinguished by the purchaser on account of its distinctive color.

A further object is to provide a process of making a thermophoric mixture having improved characteristics and which may be readily filled into receptacles, such as hot water bags or the like, through a relatively small orifice.

While combinations of sodium acetate, sodium hyposulphite, glycerine and calcium chloride have been used as heat storing compounds, their use has not been satisfactory, for the reasons above noted and the prior art does not disclose any definite methods of compounding these substances in definite proportions.

The following specification discloses a definite process of compounding the aforesaid chemicals and in definite proportions.

In order to accomplish the objects set forth, herewith follows a description of one method of carrying out the process of making this improved thermophoric mixture.

Assuming that the vessel to be filled requires a heat of recrystallization of about 125° F., the following formula would be used, the percentages referring to the weights of the respective substances:

| | Per cent |
|---|---|
| Sodium acetate | 87 |
| Glycerine | 3½ |
| Sodium hyposulphite | 8½ |
| Calcium chloride | 1 |

A suitable vessel is selected and into this is poured sufficient glycerine (preferably C. P.) to coat the bottom and side walls of the vessel in order to prevent the sodium acetate from scorching and in order to facilitate melting the same.

A portion of the sodium hyposulphite, which may be of "commercial" grade or in crystals, is now sprinkled over the bottom of the tank in order to further protect the sodium acetate from scorching.

Heat is now applied to the tank and a low heat, in no event in excess of 162° F., is applied.

The remainder of the sodium hyposulphite is now mixed with the sodium acetate and is put in the vessel. At the end of a four hour preliminary heating period and as the mixture is almost all melted, the heat is raised during the fifth hour and the mixture is vigorously agitated to prevent the formation of a crust.

When the mixture has entirely melted during which time the heat thereof has not exceeded 162° F., additional heat is applied to the vessel until it reaches 162° F., whereupon the heating is discontinued.

At all times the vessel is kept covered as tightly as possible after the mixture melts.

The next step is to pour into the mixture all of the remaining glycerine to which may be added a small quantity of water, if necessary. The mixture should be stirred vigorously until the glycerine is thoroughly incorporated therein.

The next step is to melt the calcium chloride slowly. This is preferably chemically pure and hydroscopic and, when this is melted, it should be added to the mixture in a finely divided state. This can be accomplished by putting a sieve into the mixture and pouring the melted calcium chloride into it and then forcing it out through the meshes of the sieve and into the mixture. If the calcium chloride is poured directly into the mixture it will form a doughy mess that can not be gotten through the filling funnels and into the vessels in which it is used, but by breaking it up into small particles, it will easily pass along with the mixture into the vessels where it is used.

In the event it is desired to make a mixture having a heat of recrystallization of about 127° F., then the formula is as follows:

|  | Per cent |
|---|---|
| Sodium acetate | 91¼ |
| Glycerine | 4½ |
| Sodium hyposulphite | 3¼ |
| Calcium chloride | 1 |

If it is desired to produce a mixture having a heat of recrystallization of about 130° F., then the following formula is used:

|  | Per cent |
|---|---|
| Sodium acetate | 92½ |
| Glycerine | 3 |
| Sodium hyposulphite | 3½ |
| Calcium chloride | 1 |

In order to identify this improved mixture from others that may be offered for sale, it may be colored with any suitable coloring matter that will not form objectionable compounds with the other elements used. Such a coloring matter preferably does not enter into a chemical reaction and may consist of any inert substance, such as fuller's earth colored red, green or blue or any other color by means of a suitable dye which does not chemically react with other ingredients. This results in a thermophoric mixture having a distinctive color whereby it may be distinguished from other mixtures, which can only have the color of the salts used in their compounding.

The sodium acetate may be termed a heat storing material; the sodium hyposulphite may be termed a heat regulating material, as by varying the proportion of same the point of the recrystallization of the mixture can be altered; the glycerine is primarily used to secure a soft crystal resulting from recrystallization of the entire mixture, as it is desirable to have a soft crystallization where rubber bags are used.

What is claimed, is:

1. A thermophoric mixture comprising by weight 87% sodium acetate, 8½% sodium hyposulphite, 3½% glycerine and 1% calcium chloride.

2. The process of making a thermophoric mixture consisting in heating glycerine, adding thereto sodium hyposulphite, adding to the resultant mixture a mixture of sodium acetate and sodium hyposulphite, heating the resultant mixture until melted, and adding thereto additional glycerine and calcium chloride.

3. The process of making a thermophoric mixture consisting in coating the interior of a vessel with glycerine, sprinkling over said coating crystals of sodium hyposulphite, gently heating said vessel while adding to the contents thereof a predetermined mixture of sodium hyposulphite and sodium acetate, heating the resultant mixture until melted, adding thereto a predetermined quantity of glycerine, finally adding melted calcium chloride in a divided state.

4. The process of making a thermophoric mixture consisting in heating a mixture of sodium acetate and sodium hyposulphite, and adding thereto, while liquid, melted calcium chloride in a finely divided state.

5. The process of making a thermophoric mixture consisting in heating a mixture of glycerine, sodium hyposulphite and sodium acetate, adding to the resultant mixture additional glycerine, and adding to the resultant mixture a predetermined quantity of calcium chloride in a divided state.

In testimony whereof I affix my signature.

THOMAS P. BELL.